(12) United States Patent
Niedermeier et al.

(10) Patent No.: US 8,587,214 B2
(45) Date of Patent: Nov. 19, 2013

(54) LED MODULE WITH DEDICATED COLOR REGULATION AND CORRESPONDING METHOD

(75) Inventors: Peter Niedermeier, München (DE); Oskar Schallmoser, Ottobrunn (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 483 days.

(21) Appl. No.: 12/519,328

(22) PCT Filed: Dec. 15, 2006

(86) PCT No.: PCT/EP2006/069741
§ 371 (c)(1),
(2), (4) Date: Jun. 15, 2009

(87) PCT Pub. No.: WO2008/071235
PCT Pub. Date: Jun. 19, 2008

(65) Prior Publication Data
US 2010/0026193 A1 Feb. 4, 2010

(51) Int. Cl.
*H05B 37/02* (2006.01)
(52) U.S. Cl.
USPC .................. 315/291; 315/209 R; 315/307
(58) Field of Classification Search
USPC .......... 315/308, 185 R, 209 R, 225, 291, 307, 315/312, 318; 345/72, 82–85, 88–89, 102, 345/690; 362/227, 276, 612, 800
See application file for complete search history.

(56) References Cited

U.S. PATENT DOCUMENTS

| 7,339,323 | B2* | 3/2008 | Bucur | 315/128 |
| 7,638,754 | B2* | 12/2009 | Morimoto et al. | 250/226 |
| 7,675,249 | B2* | 3/2010 | Furukawa et al. | 315/309 |
| 7,911,151 | B2* | 3/2011 | Xu | 315/247 |
| 2003/0230991 | A1 | 12/2003 | Muthu | |
| 2006/0049781 | A1 | 3/2006 | Lee et al. | |
| 2007/0046485 | A1* | 3/2007 | Grootes et al. | 340/815.45 |
| 2008/0089064 | A1* | 4/2008 | Wang | 362/249 |

FOREIGN PATENT DOCUMENTS

| CN | 1662949 | 8/2005 |
| DE | 27 58 551 | 6/1979 |
| EP | 1 628 286 | 2/2006 |

* cited by examiner

*Primary Examiner* — Jimmy Vu
(74) *Attorney, Agent, or Firm* — Cozen O'Connor

(57) ABSTRACT

An LED module for backlighting a screen comprising at least one LED, (LR, LG1, LG2, LB), a sensor device for detecting at least one physical quantity, and a drive device for driving the at least one LED (LR, LG1, LG2, LB) depending on a signal from the sensor device.

7 Claims, 4 Drawing Sheets

LED MODULE WITH DEDICATED COLOR REGULATION AND CORRESPONDING METHOD

RELATED APPLICATIONS

This is a U.S. national stage of application No. PCT/EP2006/069741, filed on Dec. 15, 2006.

FIELD OF THE INVENTION

The present invention relates to an LED module for backlighting a screen comprising at least one LED. Furthermore, the present invention relates to a method for backlighting a screen by driving a plurality of LED modules with a predeterminable current.

BACKGROUND OF THE INVENTION

LED screens are generally backlit with the aid of LEDs. For this purpose, a plurality of LED modules are interconnected and operated. In this case, the LED modules are connected in series. Each module generally has one blue, one red and one or two green LEDs. These series are then arranged in parallel fashion again in order to achieve a uniform illumination of the screen.

The luminous efficiency of LEDs and in particular of high-power LEDs changes with the lifetime and depending on the temperature. This results in a continual change in the emission spectrum or the color locus (main emission line) on a wavelength or frequency scale. This change is undesirable in principle and results, if the LEDs are used for backlighting LCD screens, in incorrect color representation of still and moving images. These color disturbances can occur both areally and in punctiform fashion.

Hitherto, backlights for screens have been readjusted in their entirety or line by line with regard to their color and their white point. The final setting and calibration are effected after the preassembly of the backlight units (BLU) in the factory. If appropriate, the color is automatically tracked during operation by precisely the entire screen or the individual lines being tracked. However, this does not always lead to high-quality results.

SUMMARY OF THE INVENTION

One object of the present invention is to improve the quality of the readjustment of backlights of a screen.

This and other objects are attained in accordance with one aspect of the present invention directed to an LED module for backlighting a screen comprising at least one LED, a sensor device for detecting at least one physical quantity, and a drive device for driving the at least one LED depending on a signal from the sensor device.

Another aspect of the present invention is directed to a method for readjusting an LED module for backlighting a screen by driving at least one LED of the LED module with a predetermined current, detecting at least one physical quantity of the LED module when the predetermined current flows through the LED, and changing the current through the LED depending on the at least one physical quantity detected.

It is therefore advantageously possible for each individual LED module to be automatically readjusted if its color changes in the course of operation. A very uniform and constant backlight can thereby be ensured over a long time.

Preferably, the sensor device comprises a color sensor in order to ascertain color changes of the at least one LED. In particular, the color sensor can be a $V(\lambda)$ sensor modeled on eye sensitivity. However, the color sensor can also be realized by simply using a brightness sensor and successively checking the LEDs of different colors with regard to their luminous intensity. This results indirectly in a detection of the color intensity.

As an alternative or in addition, the sensor device can also comprise a temperature sensor in order to ascertain a temperature of the LED module. It is thereby possible to compensate for brightness fluctuations of the LEDs that result from temperature changes.

In accordance with a further embodiment of the present invention, the drive device can comprise a memory for storing a calibration value and a comparator for comparing a present signal of the sensor device with the calibration value. Color tracking with predetermined values can be achieved in a simple manner with these components.

It is particularly advantageous, moreover, if a shunt transistor controlled by the drive device is connected in parallel with the at least one LED in order to reduce the current flowing through the LED depending on the physical quantity detected. By this means, a different luminous intensity of the individual luminous bodies can be achieved even in a series circuit comprising a plurality of LEDs.

Furthermore, the at least one LED can be arranged with and connected up to the sensor device and the drive device on a common circuit board, in particular a metal-core circuit board. The entire LED module can thus be processed simply and, if appropriate, also automatically with respect to an arrangement of a backlight unit.

Furthermore, it is favorable if the drive device has a data interface. Via this interface, calibration values can be input into the LED modules in a desired manner during calibration in the context of preassembly.

In accordance with a further preferred embodiment, the LED module has a plurality of LEDs which can be driven independently of one another by the drive device. The tracking of each LED on the LED module can thus be effected individually.

As has already been indicated, a plurality of LED modules of the type mentioned can be interconnected to form a backlight device for a screen, wherein the plurality of LED modules are connected in series with one another.

PREFERRED EMBODIMENTS OF THE INVENTION

The embodiments outlined in greater detail below represent preferred exemplary embodiments of the present invention.

Figure 1:
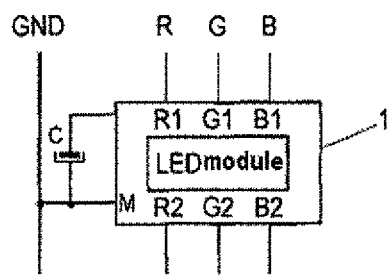
FIG. 1 shows the external interconnection of an RGB LED module.

The LED module 1 represented in FIG. 1 has two terminals R1 and R2 with a red LED connected between them. By way of example, the terminal R1 is connected to the anode of the red LED and the terminal R2 is connected to the cathode of the red LED. A drive signal R, in particular a PWM signal (pulse width modulation), for controlling the red LED is applied to the terminal R1. The operating current for the red LED leaves the LED module 1 at the terminal R2 in the present example.

In the same way, a green LED in the LED module 1 is connected to the two terminals G1 and G2 and is driven by a drive signal G. A blue LED in the LED module 1 is likewise operated with a drive signal B via the terminals B1 and B2.

Furthermore, the LED module 1 is connected to ground via a terminal M. Moreover, the LED module 1 is supplied with DC current with the aid of an electrolytic capacitor C. The latter is supplied with energy internally by rectification of parts of the drive signals R, G, B.

Figure 2:
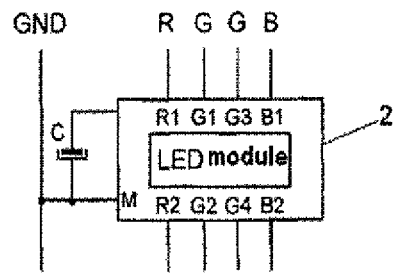
FIG. 2 shows the external interconnection of an RGGB module.

For reasons of the luminous intensity of green LEDs it is often necessary to provide two green LEDs in an LED module 2, as is indicated in FIG. 2. The basic construction of the LED module 2 corresponds to that of the LED module 1 from FIG. 1. The LED module 2 is merely provided with two further terminals G3 and G4 for the two green LEDs, in order to be able to drive the two green LEDs separately.

Figure 3:
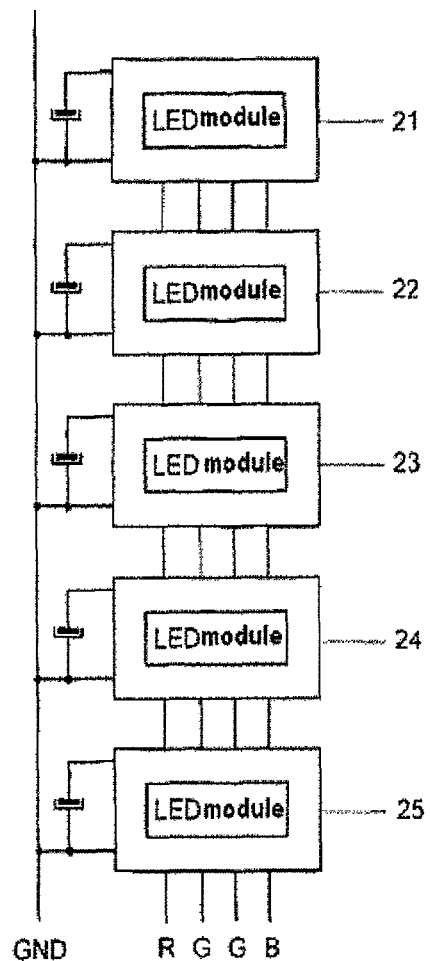
FIG. 3 shows a series circuit comprising a plurality of LED modules in accordance with FIG. 2.

The LED modules 1, 2 presented in FIGS. 1 and 2 are typically connected in series for screen backlights. FIG. 3 shows such a series circuit comprising LED modules 21, 22, 23, 24 and 25. The modules are designed in the manner of the LED module 2 from FIG. 2 with two green LEDs in each case. It can be discerned that all the modules are driven with a single signal R, with two signals G and with one further signal B.

Figure 4:
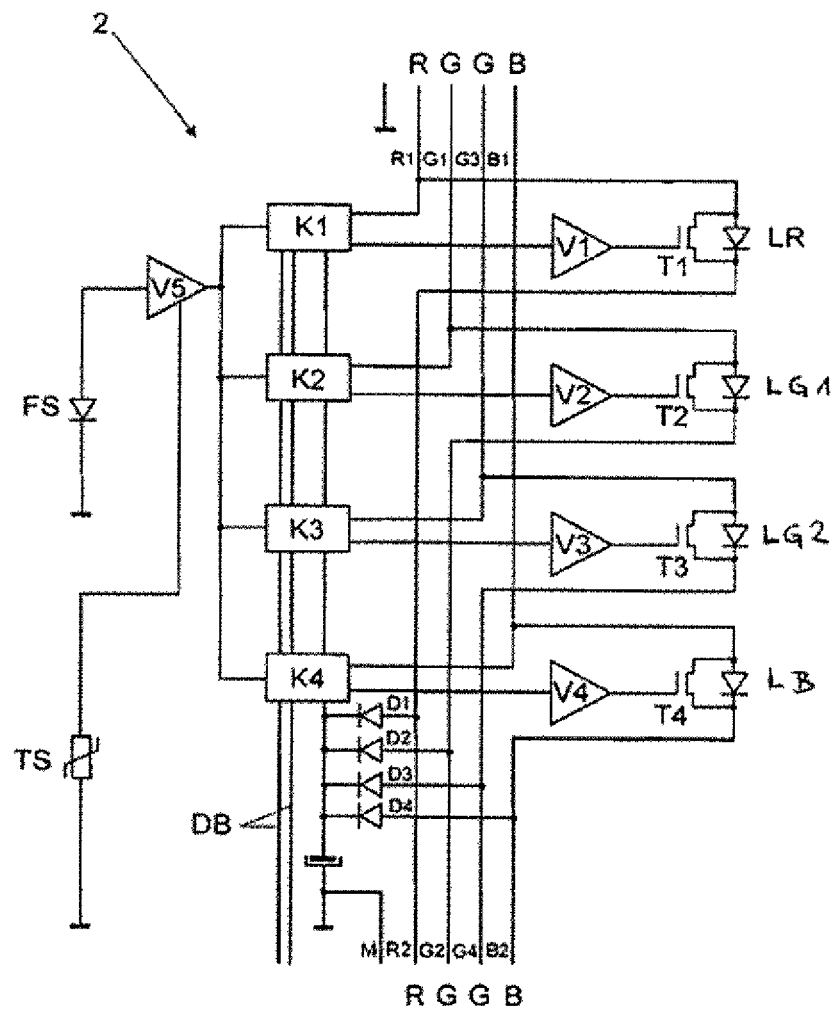
FIG. 4 shows the internal construction of an LED module in accordance with FIG. 2.

FIG. 4 then schematically shows the internal construction of the module 2 from FIG. 2. A red light-emitting diode LR is connected to the terminal R1 by its anode and to the terminal R2 by its cathode. In this way as well the first green light-emitting diode LG1 is connected to the terminals G1 and G2, the second green light-emitting diode LS2 is connected to the terminals G3 and G4 and the blue light-emitting diode LB is connected to the terminals B1 and B2. The current through the respective light-emitting diodes is therefore primarily determined by the control signals R, G and B.

A respective shunt transistor T1, T2, T3 and T4 is connected in parallel with each light-emitting diode. These shunt transistors are respectively driven by amplifiers V1, V2, V3 and V4. The amplifiers V1 to V4 receive their drive signals from comparators K1 to K4. Each of said comparators has a memory in which a respectively specific calibration value is stored. This memory value can be fed in via a data bus DB. The comparator compares said calibration value with a present brightness value which it receives from a color sensor FS via an amplifier V5. In the present example, the color sensor FS is realized by a photodiode. A single photodiode which generally measures the brightness is sufficient since the individual diodes can be driven separately for readjustment.

The current supply of the circuit of the LED module 2 and in particular of the comparators K1 to K4 is effected by the electrolytic capacitor C. The latter is fed by the drive signals R, G, G, B via diodes D1 to D4. For this purpose, the anodes of the four diodes D1 to D4 are connected to the terminals R2, G2, G4 and B2 and the cathodes of the diodes D1 to D4 are connected to the corresponding electrode of the electrolytic capacitor C.

Since the brightness of the individual light-emitting diodes, but also the color locus thereof, on the wavelength scale, is dependent on the temperature, a temperature sensor TS is also provided in the LED module 2. In the present example, said temperature sensor is realized by a thermistor. Its signal serves for controlling the amplifier V5.

The calibration and readjustment of an LED module according to the invention, also called an LED cluster, are described briefly below. Each LED module is calibrated after production and then passes to a screen manufacturer, for example. The latter then manufactures with the LED modules the final BLU, which can then be set to the desired color locus with little outlay. Punctiform deviations that arise during the lifetime of the LED modules can be automatically corrected by means of the individual readjustment.

For the automatic readjustment, as mentioned in connection with FIG. 4, each LED module is provided with a dedicated sensor FS and an integrated circuit comprising the components illustrated in FIG. 4. This integrated circuit including the sensors and LEDs is preferably mounted on a common circuit board. The punctiform readjustment is effected by a procedure in which the color sensor, e.g. a photodiode modeled on eye sensitivity, detects the brightness of an LED and the shunt transistor situated with respect to the LED to be readjusted is opened to a certain extent, if appropriate, such that it conducts part of the current past the LED. A reduction of the brightness of an affected LED can therefore be achieved in the context of the readjustment.

Figure 5:
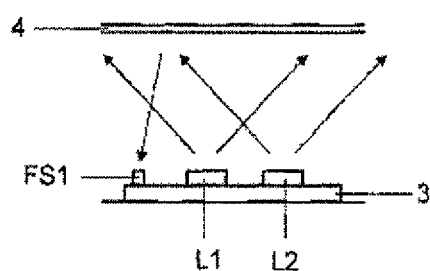
FIG. 5 shows a cross section through an LED module with indirect, optical coupling of the sensor.

The coupling of the light or color sensor FS to the LEDs can be effected either indirectly or directly. The indirect coupling of the color sensor FS on an LED module circuit board 3 is illustrated schematically in FIG. 5. The light from the LEDs L1, L2 is emitted in the direction of a diffusing screen 4 of a BLU. Part of the light is reflected back to the color sensor FS at the diffusing screen 4.

The amount of reflected light is a measure of the luminous intensity of the respective light-emitting diode L1, L2.

Figure 6:
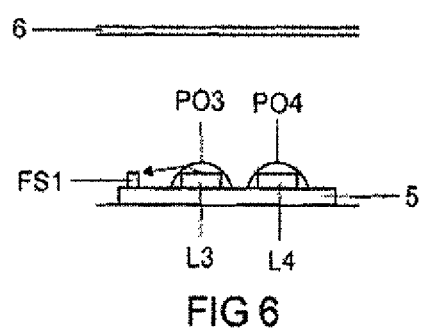
FIG. 6 shows a cross section through an LED module with direct, optical coupling of the sensor.

The direct coupling of the color sensor FS to the light-emitting diodes L3, L4 is represented schematically in FIG. 6. Each of the light-emitting diodes L3 and L4 of the LED module circuit board 5 is provided with a primary optical unit PO3, PO4. Part of the light which leaves a light-emitting diode, e.g. L3, is diffracted at the primary optical unit PO3 and directed directly onto the color sensor FS2. The diffusing screen 6 plays no or only a subordinate role in the case of this direct coupling. The direct coupling of the color sensor to the LEDs can, however, also be effected by means of an optical waveguide that guides the light directly onto the sensor.

The current bypass through a shunt transistor is expediently not more than approximately 10 per cent. An excessively great heating of the IC or an excessively great reduction of the efficiency can thereby be avoided.

By means of the individually measured modules or clusters it is easily possible for the user to assemble a BLU. The color locus with an impressed PWM signal then also remains stable over the course of the lifetime and the temperature. The user therefore does not have to have special knowledge about the color temperature readjustment. A further advantage of the LED modules illustrated by way of example is that their wiring outlay is relatively low. Moreover, the individual integrated circuits on the modules are supplied separately, and the energy absorption elements for the components are obtained from the drive signals, whereby the circuitry outlay likewise decreases.

The invention claimed is:

1. A backlight device for a screen comprising a plurality of LED modules, wherein each LED module comprises:
   at least one red LED, at least one green LED and at least one blue LED;
   a sensor device configured to detect at least one physical quantity; and a drive device for driving the at least one red LED, the at least one green LED and the at least one blue LED based on a signal from the sensor device, wherein each of the at least one red LED, the at least one green LED and the at least one blue LED are configured to be driven independently of one another by the drive device;

wherein each of the at least one red LED, the at least one green LED and the at least one blue LED have a respective shunt transistor connected in parallel thereto, each shunt transistor configured to be controlled by the drive device to reduce the current flowing through the respective LED connected in parallel thereto based on the physical quantity detected by the sensor device, wherein corresponding ones of the at least one red LED of each of the plurality of LED modules are connected in series across each module, corresponding ones of the at least one green LED of each of the plurality of LED modules are connected in series across each module, and corresponding ones of the at least one blue LED of each of the plurality of LED modules are connected in series across each module, and wherein the at least one red LED, the at least one green LED and the at least one blue LED are not connected in series with each other in each individual LED module.

2. The backlight device as claimed in claim 1, wherein the sensor device of each said LED module comprises a color sensor configured to ascertain color changes of the at least one red LED, the at least one green LED and the at least one blue LED.

3. The backlight device as claimed in claim 1, wherein the sensor device of each said LED module comprises a temperature sensor configured to ascertain a temperature of the LED module.

4. The backlight device as claimed in claim 1, wherein the drive device of each said LED module comprises a memory for storing a calibration value and a comparator for comparing a present signal of the sensor device with the calibration value.

5. The backlight device as claimed in claim 1, wherein the at least one red LED, the at least one green LED and the at least one blue LED of each said LED module are arranged with and coupled to the sensor device and the drive device on a common circuit board.

6. The backlight device as claimed in claim 1, wherein the drive device of each said LED module has a data interface.

7. The backlight device as claimed in claim 1, wherein at least one of a color and a temperature is detected as the physical quantity.

\* \* \* \* \*